United States Patent Office 3,151,499
Patented Oct. 6, 1964

3,151,499
ADJUSTABLE PEDAL FOR VEHICLE
Ronald W. Roe, Royal Oak, Mich., assignor to General Motors Corporation, Detroit, Mich., a corporation of Delaware
Filed Nov. 13, 1962, Ser. No. 236,992
7 Claims. (Cl. 74—560)

The invention relates to a pedal adjusting and motion transmitting system and more particularly to a system for adjusting the positions of the brake and accelerator pedals of an automotive vehicle to a particular operator without changing the motion transmitting relationships of the pedals to the systems being controlled by pedal actuation. Automotive vehicles are normally provided with pedals for controlling various vehicle elements or systems and these pedals are positioned so that the average individual is able to actuate them from a comfortable position. A reasonably comfortable arrangement is available by adjusting the vehicle seat distance in relation to the pedals. Some vehicles are also provided with seats that adjust according to height and angle. Many vehicles, however, are manufactured with a seat which is either nonadjustable or which only moves forward and backward. This arrangement is not completely satisfactory for persons who have either extremely short or extremely long legs. The structure embodying the invention permits location of the control pedals so that a vehicle may be driven by various individuals with comfort by permitting the pedals to be adjusted to the desired height in accordance with the physical dimensions and desires of individuals of different size and proportion.

A mechanism embodying the invention preferably comprises a mounting arrangement for the brake and accelerator pedals and control linkage associated therewith wherein the pedals and the control linkage are pivoted and translated while maintaining the pedals in an operative position. The mechanism includes adjusting and holding means for varying and maintaining the desired pedal height. In the preferred embodiment illustrated, this mechanism is motor actuated so as to be readily adjustable under control of the vehicle operator. The mechanism is so arranged as to have no effect on the accelerator rod or the brake rod while the pedal height is being adjusted. Thus, the application of the brake pedal or the accelerator pedal by the vehicle operator provides the same vehicle control in any adjusted position of the pedals. The mechanism may be arranged to adjust both pedals simultaneously, as illustrated in the preferred embodiment, or, if desired, may be provided to adjust the pedals independently, or to provide a pedal adjustment for more or less pedals in accordance with the particular vehicle installation.

Figure 1:
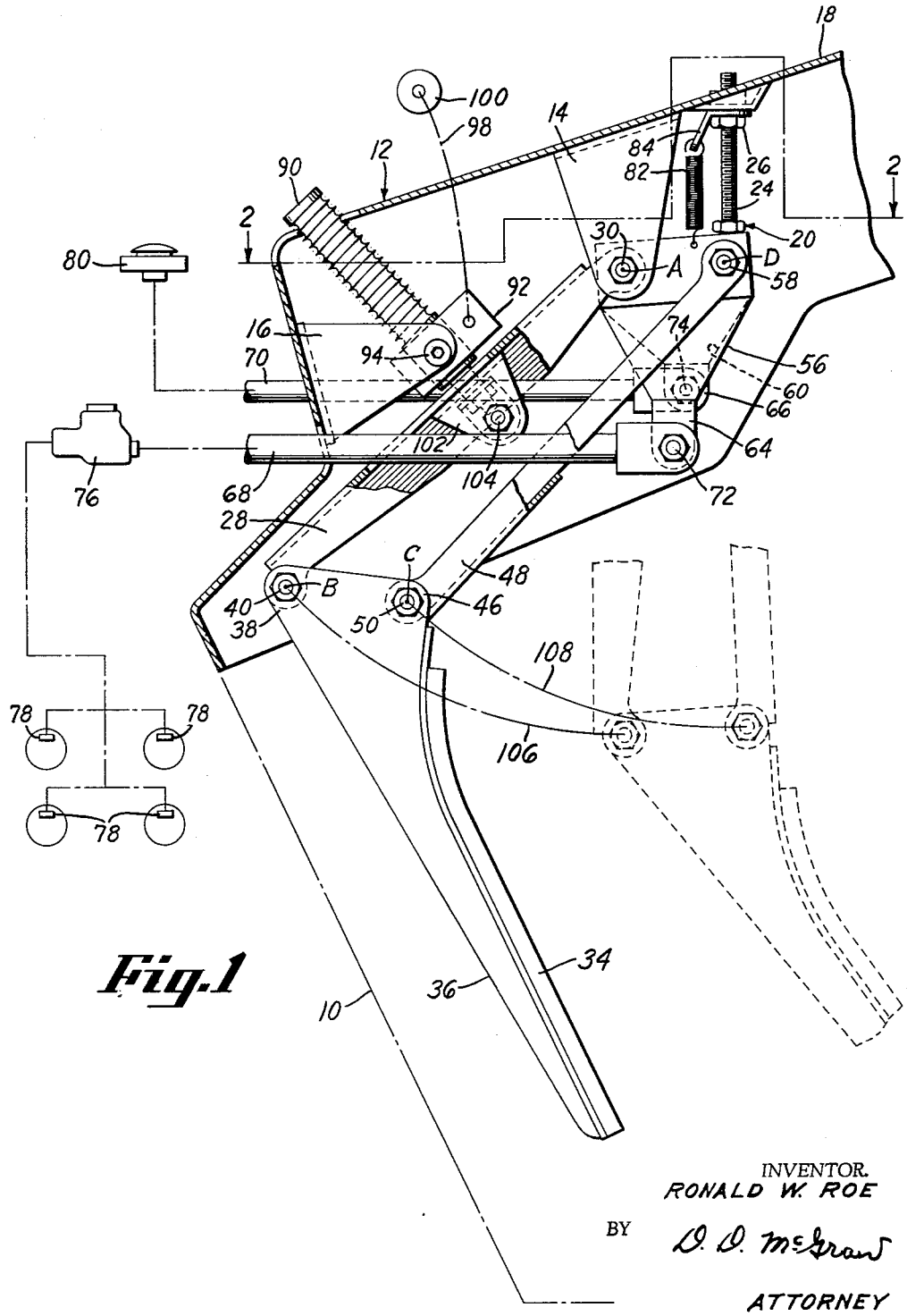
FIGURE 1 is a side view, with parts broken away and in section, taken in the direction of arrows 1—1 of FIGURE 2, illustrating a mechanism embodying the invention, the pedals being adjusted to the low position and unactuated and including portions of the vehicle control systems in schematic form.
Figure 2:
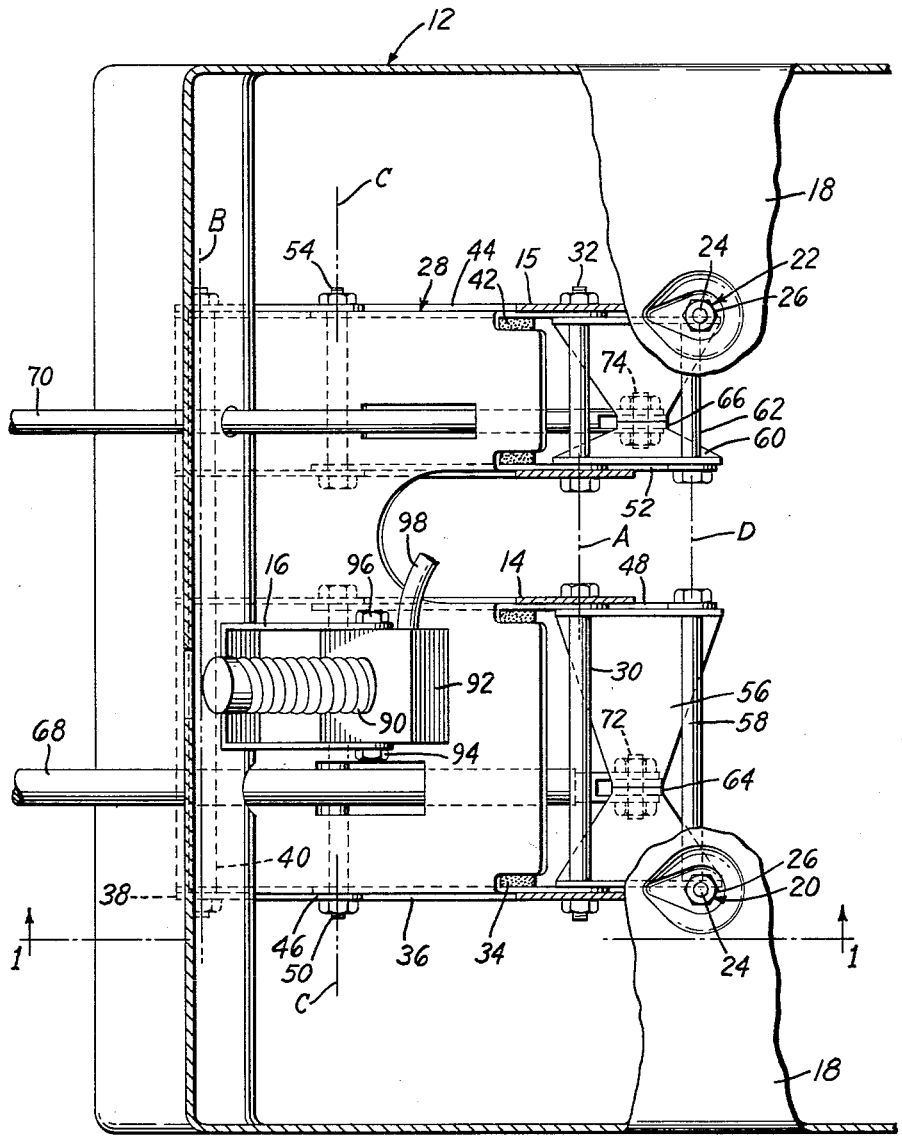
FIGURE 2 is a view of the mechanism of FIGURE 1 with parts broken away and in section and taken in the direction of the arrows 2—2 of FIGURE 1.

The mechanism is shown installed in a vehicle having a toe board 10 which may also be the vehicle firewall. A mounting bracket 12 is suitably secured to the vehicle firewall and under the instrument panel. The mounting bracket 12 includes yokes 14 and 15, an actuator bracket 16, and a top section 18 in which bellcrank stops 20 and 22 are mounted. Each of the stops 20 and 22 includes a bolt 24 and an adjusting and locking nut 26.

A brake and accelerator pedal support link 28 is pivotally attached to mounting bracket 12 by pivot bolts 30 and 32 which also respectively pass through the support link yokes 14 and 15. The bolts 30 and 32 are axially aligned and their common axis is identified in the drawings as pivot A. The support link 28 is generally U-shaped, with one leg being associated with yoke 14 and bolt 30 and the other leg being associated with yoke 15 and bolt 32.

The brake pedal 34 is secured to the brake pedal link 36. Link 36 is pivotally attached at one corner 38 to the lower end of support link 28 by bolt 40. The accelerator pedal 42 is similarly attached to the accelerator pedal link 44 and is also pivotally attached to support link 28 by bolt 40. The pivotal axis of bolt 40 is identified as pivot B. The corner 46 of pedal link 36 is pivotally attached to the brake link 48 by bolt 50 and the bolt axis is identified as pivot C. The accelerator pedal link 44 is similarly attached to the accelerator link 52 by bolt 54, the axis of which also lies on pivot C.

Figure 5:
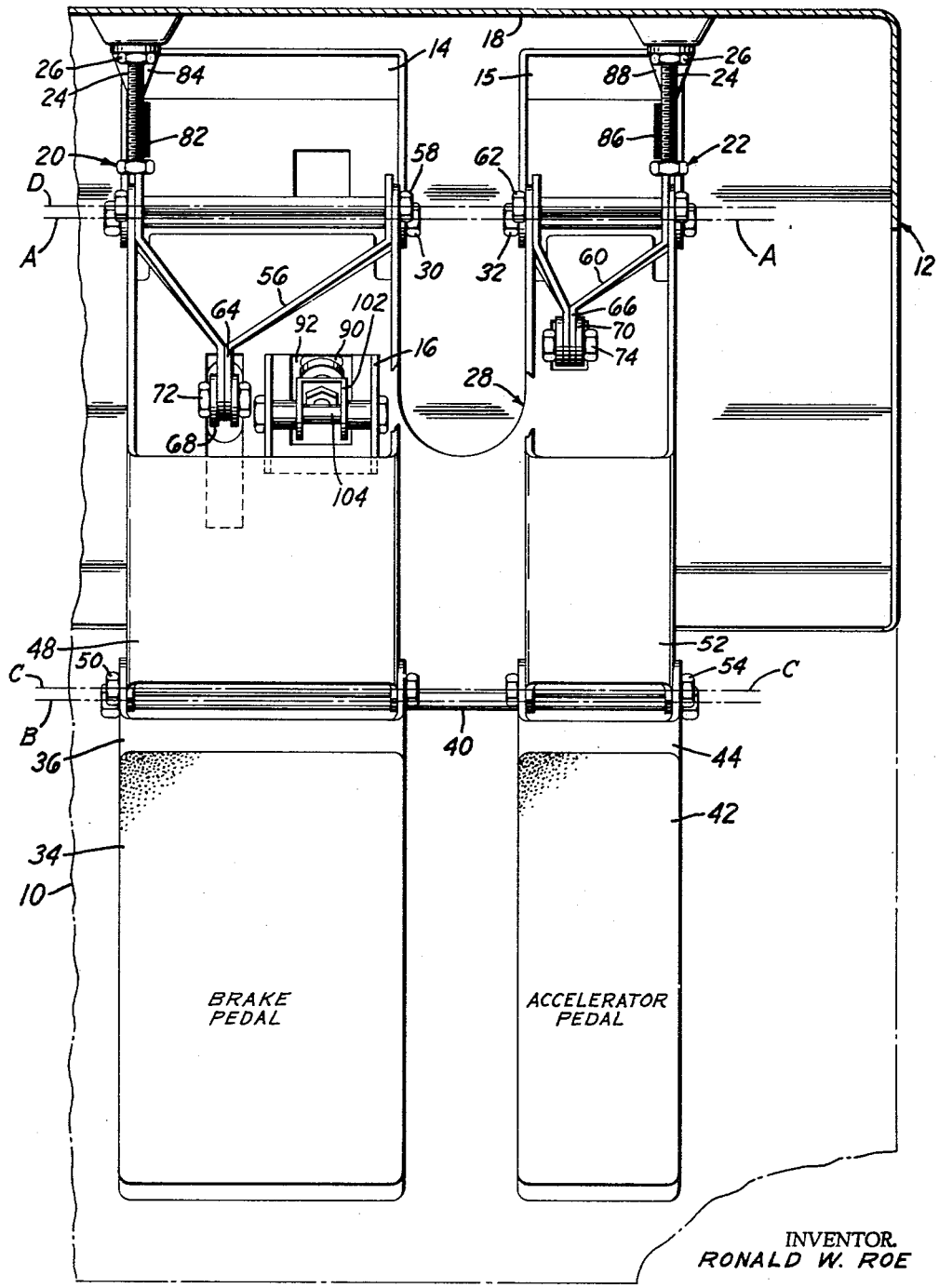
FIGURE 5 is a view of the mechanism generally similar to the vehicle operator's view and taken in the direction of arrow 5 of FIGURE 3.

A brake bellcrank 56 is pivotally attached to yoke 14 by bolt 30 so that it also pivots about pivot A. Brake link 48 is also pivotally attached to bellcrank 56 by bolt 58 and the axis of that bolt is identified as pivot D. Pivots A, B, C and D are parallel to and spaced from each other. An accelerator bellcrank 60 is similarly pivotally attached to yoke 15 and support link 28 by bolt 32 and has the accelerator link 52 pivotally attached to it by bolt 62. The axis of this bolt also lies along pivot B. The bellcranks 56 and 60 may be generally Y-shaped as shown in FIGURE 5 so that their lower ends 64 and 66 provide single attachment points for the brake push rod 68 and the throttle push rod 70, respectively. Rods 68 and 70 are pivotally attached to bellcranks 56 and 60 by suitable pivot bolts 72 and 74. These rods also extend through openings formed in the mounting bracket 12 and the vehicle firewall and are movable substantially along their axes when they are operated. The brake push rod 68 is connected to the brake master cylinder 76 which in turn is fluid connected to actuate the vehicle wheel brakes 78. The throttle push rod 70 is suitably connected to the engine carburetor 80 to actuate the engine throttle.

A tension spring 82 is attached to the brake bellcrank 56 and to a suitable lug 84 and urges the bellcrank 56 to pivot about pivot A so that it normally engages the bellcrank stop 20. Thus, spring 82 functions as a brake pedal return spring. A similar spring 86 is attached to a lug 88 and to the accelerator bellcrank 60 and urges the bellcrank 60 into engagement with the bellcrank stop 22. Spring 86 thus acts as the accelerator pedal return spring. It therefore assists the usual throttle return spring.

The pedal adjusting and holding actuating mechanism includes a screw 90 threaded through a screw actuator, which may be of the recirculating ball or worm type. The housing of actuator 92 is pivotally attached to actuator bracket 16 by pivot screws 94 and 96. Screw actuator 92 is suitably driven by a flexible cable 98. In the preferred embodiment cable 98 is driven by a reversible electric motor 100 for which suitable operator actuator controls may be provided. Other types of power sources, or manually operable means, may be used.

One end of screw 90 is pivotally attached by pivot bolt 104 to a yoke 102 formed on support link 28. Yoke 102 is spaced intermediate pivots A and B on support link 28 and screw 90 extends at an angle from link 28 so that movement of the screw by actuator 92 results in pivotal movement of link 28 about pivot A. The screw actuator 92 and the threads of screw 90 are preferably so constructed so as to hold screw 90 in any desired extended or retracted position by a locking action so that forces exerted axially of screw 90 will not cause the screw to rotate and change the pedal adjustment.

FIGURE 1 illustrates the mechanism with the pedals adjusted to the long position. The brake pedal 34 is spaced from the toe board 10 only a sufficient amount to permit pivotal movement of the pedal about pivot B so as to actuate the brakes. The same is true of the accelerator pedal 42. Since the brake and accelerator pedals operate in a similar manner, only the brake pedal operation will be described in detail.

In the position shown in FIGURE 1, pivot A is fixed and pivot B is held in a fixed position due to the holding action of the screw 90 and its actuator 92. The spring 82 holds the brake bellcrank 56 against the stop 20. The brake push rod 68 is exerting no force on the master cylinder 76. When the operator moves the brake pedal 34 with his foot, it pivots clockwise about pivot B, thus moving pivot C downwardly and slightly forwardly. This movement causes brake link 48 to move substantially axially, with a slight translatory movement, in a downward and forward direction. Since link 48 is attached at pivot D to the bellcrank 56, this bellcrank is pivoted about the fixed pivot A in a clockwise direction. This results in movement of brake pivot 72 in an arc which is substantially along the axis of the brake push rod 68. Since the push rod 68 is attached to bellcrank 56 at pivot 72, it is moved in a substantially axial direction forward. As is the usual construction, slight pivotal movement of the brake rod is permitted at the master cylinder so that the master cylinder is actuated linearly to apply the brakes. When the operator releases the pedal, the spring 82 returns the bellcrank 56 to engagement with stop 20, thus moving link 48 upwardly and rearwardly, lifting pedal 34 and pivoting it about the fixed pivot B.

Figure 3:
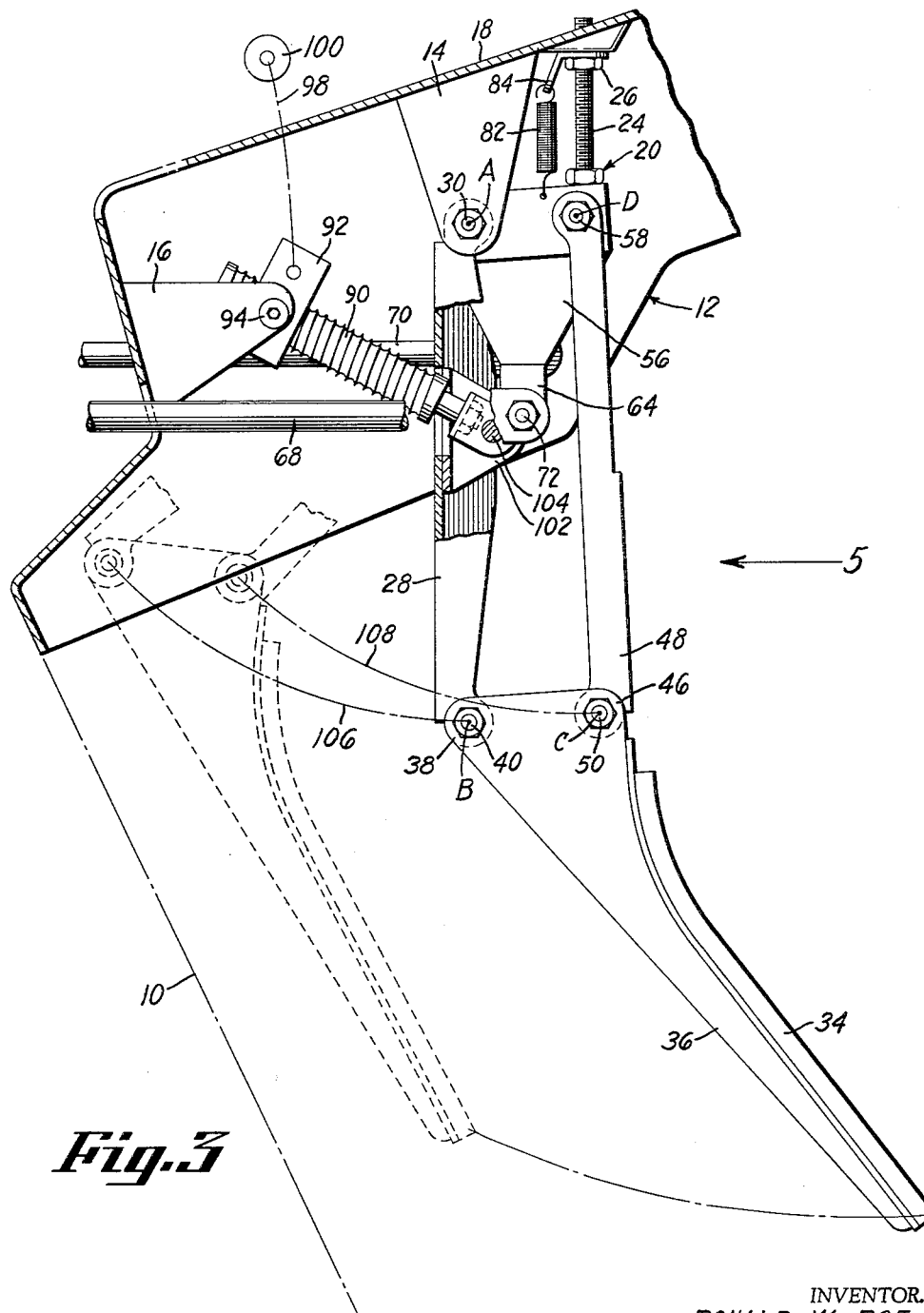
FIGURE 3 is a view similar to that of FIGURE 1 but shows the mechanism with the pedal height adjusted to the short position, the pedals being unactuated.
Figure 4:
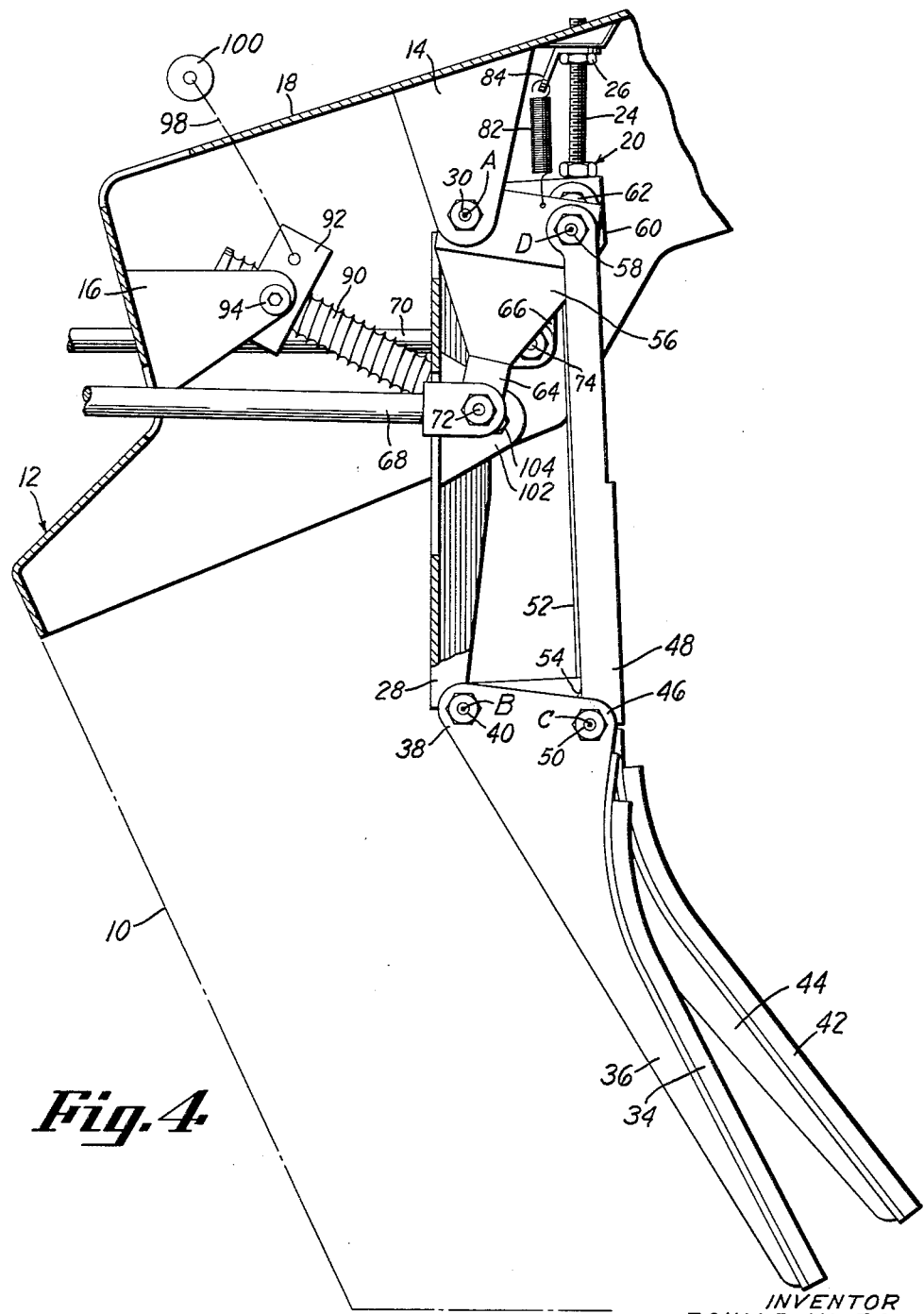
FIGURE 4 is a view similar to that of FIGURE 3 and showing the brake pedal in the actuated or brake apply position while the accelerator pedal is in the unactuated or zero throttle position.

When it is desired to adjust the pedal height to a higher position, the operator energizes the motor 100 in a direction to cause screw 90 to extend downwardly and rearwardly. The screw pushes the brake and accelerator and support link 28 counterclockwise about pivot A, at the same time pivoting about the screws 94 and 96. The pivotal movement of link 28 about pivot A causes pivot B to move along the path 106 and pivot C to move along the path 108. This occurs since spring 82 holds pivot D fixed against the stop 20 through the bellcrank 56. No movement of the bellcrank 56 occurs due to pivotal movement of link 28 and therefore no change is made in the position of brake push rod 68 due to this adjustment. The pedal 34 may be adjusted to the position shown in dash lines in FIGURE 1, or to any intermediate position. FIGURE 3 shows the short or high adjusted position of the pedal with the long or low adjusted position being shown therein in dash lines.

The mechanism disclosed will adjust and hold the brake and accelerator pedals in an infinite number of height poistions relative to the vehicle toe board independently of brake and accelerator actuation, and may be readily so adjusted to any operator. The mechanism includes a series of four links joined by pivots, one of which is always stationary and two of which are alternately stationary, one during adjustment of pedal height, and the other during pedal actuation. At no time is the control link for the brake or accelerator push rod moved in order to adjust the pedal height. These adjustments are attained by providing a screw-type link which has an adjustable effective length. The mechanism, therefore, operates to provide a more satisfactory pedal position for the vehicle operator.

I claim:
1. A pedal adjusting and motion transmitting system comprising, mounting means having first and second fixed pivots thereon, a motion output link and a pedal support link each having one end pivotally attached at said first fixed pivot to said mounting means, a pedal link having one end pivotally attached to the other end of said pedal support link and further having a pedal mounted thereon, a fourth link having opposite ends respectively pivotally attached to the other ends of said motion output link and said pedal link, a variable effective length pedal adjusting link having one end pivotally attached to said pedal support link intermediate the ends thereof and being pivotally attached to said second fixed pivot to said mounting means, a stop on said mounting means engageable with said motion output link to limit pivotal movement thereof about said first fixed pivot in one direction, means attached to said motion output link and to said mounting means urging said motion output link toward said stop, and means for adjusting the effective length of said pedal adjusting link to cause pivotal movement of said pedal support link and said fourth link with said motion output link remaining stationary, said adjusting link acting after adjustment to hold said pedal support link immovable relative to said mounting means whereby pivotal movement of said pedal link on said support link is transmitted through said fourth link to cause said motion output link to pivot about said first fixed pivot.

2. A pedal adjusting and output controlling mechanism comprising, a pedal input; a control output; a multiple link-and-pivot motion transfer unit having said input and said output attached thereto to transmit output controlling motion therebetween through said unit; and a pedal position adjusting input attached to said motion transfer unit and selectively acting thereon to first move said pedal input to any one of a plurality of adjusted pedal positions while said control output remains stationary, and to hold a pedal adjusted position to permit controlled movement of said pedal input to be transferred through said motion transfer unit to produce a correlated controlled movement of said control output.

3. In a linkage system; first and second and third and fourth links and pivots wherein: said first pivot joins said first and second links, said second pivot joints said second and third links, said third pivot joins said third and fourth links, and said fourth pivot joins said fourth and first links; anchoring means for holding said first pivot stationary; first means urging said first link and said fourth pivot to remain stationary; second means attached to and acting on said second link to selectively move said second link pivotally about said first pivot and said fourth link about said fourth pivot, in cooperation with said first means, and to selectively hold said second link and said second pivot stationary; and third means movable to overcome the force of said first means for respectively moving said first and third links pivotally about said first and second pivots.

4. A vehicle control pedal system for adjusting the control pedal position to the vehicle driver independently of vehicle controlling movements of the control pedal, said system comprising; mounting means adapted to be secured to a vehicle; control pedal linkage including first and second and third and fourth links and pivots wherein: said first pivot joins said first and second links, said second pivot joins said second and third links, said third pivot joins said third and fourth links, and said fourth pivot joins said fourth and first links; a control pedal secured to said third link; a vehicle control actuating mechanism secured to and sensitive to movements of said first link; means supporting said first pivot stationary on said mounting means; first means urging said first link and said fourth pivot to remain stationary relative to said mounting means, second means attached to and acting on said second link to selectively move said second link pivotally about said first pivot and said fourth link about said fourth pivot, in cooperation with said first means, and to selectively hold said second link and said second pivot stationary; vehicle controlling movement of said control pedal by the vehicle driver respectively moving said first and third links pivotally about said first and second pivots against the force of said first means to control movement of said vehicle control actuating mechanism.

5. The vehicle control pedal system of claim 4, said means attached to and acting on said second link comprising a fifth link pivotally attached at spaced points thereon to said second link and to said mounting means and having an adjustable effective length between the pivotally attached points thereof.

6. The vehicle control pedal system of claim 5, said fifth link comprising a screw and a screw actuator, and means for driving said screw actuator to increase and decrease the effective length between the pivotally attached points of said fifth link to change the control pedal position.

7. For use in an automotive vehicle, a vehicle brake and accelerator pedal mounting and control system for adjusting the pedal position to the driver independently of pedal control movements, said system comprising: mounting means secured to said vehicle; brake linkage including first and second and third and fourth links and pivots wherein said first pivot joins said first and second links, said second pivot joins said second and third links, said third pivot joins said third and fourth links, and said fourth pivot joins said fourth and first links; accelerator linkage including first and second and third and fourth links and pivots wherein said first pivot joins said first and second links, said second pivot joins said second and third links, said third pivot joins said third and fourth links, and said fourth pivot joins said fourth and first links; means supporting said brake linkage and said accelerator linkage first pivots immovably on said mounting means; first means urging said first links and said fourth pivots to remain stationary; second means attached to and acting on said second links to selectively move said second links pivotally about said first pivots and said fourth links about said fourth pivots in cooperation with said first means, and to selectively hold said second links and said second pivots stationary; third means movable to overcome said first means for respectively moving said first and third links pivotally about said first and second pivots, said third means including a brake pedal attached to said third brake link and an accelerator pedal attached to said third accelerator link; and a brake actuating member and a throttle actuating member respectively attached to and actuated by movement of said first brake link and said first accelerator link.

References Cited in the file of this patent
UNITED STATES PATENTS

| | | |
|---|---|---|
| 2,124,100 | Bailey | July 19, 1938 |
| 2,967,433 | Phillips | Jan. 10, 1961 |
| 3,088,331 | Bachmann | May 7, 1963 |

FOREIGN PATENTS

| | | |
|---|---|---|
| 813,923 | Great Britain | May 27, 1959 |
| 920,784 | Great Britain | Mar. 13, 1963 |